United States Patent [19]

Fragoso

[11] 4,167,225
[45] Sep. 11, 1979

[54] BRAKE ASSEMBLY FOR WHEELED PERSONAL VEHICLE

[76] Inventor: Raymond Fragoso, 1967 Courtland Ave., Oakland, Calif. 94601

[21] Appl. No.: 888,304

[22] Filed: Mar. 20, 1978

[51] Int. Cl.$^2$ ............................................. B60T 1/14
[52] U.S. Cl. ...................................... 188/5; 280/11.2; 280/87.04 A
[58] Field of Search ...................... 188/5, 6; 280/11.2, 280/11.21, 87.04 A, 605

[56] References Cited

U.S. PATENT DOCUMENTS

| | | | |
|---|---|---|---|
| 1,530,165 | 3/1925 | Fowler | 280/87.04 A |
| 2,200,935 | 5/1940 | Rodriguez | 188/5 |
| 3,307,658 | 3/1967 | Stevenson | 188/5 |
| 3,472,332 | 10/1969 | Halvajian | 188/5X |
| 4,037,852 | 2/1977 | Bayer et al. | 280/11.2 X |
| 4,054,296 | 10/1977 | Sullins | 188/5 X |

*Primary Examiner*—George E. A. Halvosa
*Attorney, Agent, or Firm*—Harris Zimmerman

[57] ABSTRACT

A brake assembly for a wheeled personal vehicle such as a scooter or the like includes a brake shoe adapted for selective frictional engagement with the ground, and hingedly secured to the rear underside of the vehicle. A flat head plunger is secured at its lower end to a channel formed in the brake shoe, and extends upwardly through a slot in the rear portion of the vehicle. A pedal is hingedly secured to the top rear surface of the vehicle, and is provided with a collar which engages the upper ball end of the plunger. The plunger may be depressed by the foot of the vehicle rider, forcing the brake shoe to frictionally engage the ground surface and slow the vehicle.

1 Claim, 5 Drawing Figures

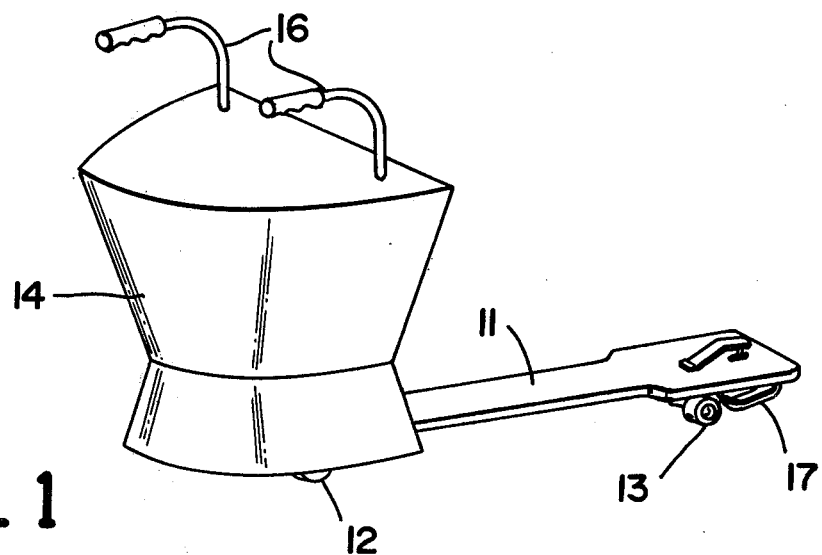
FIG_1
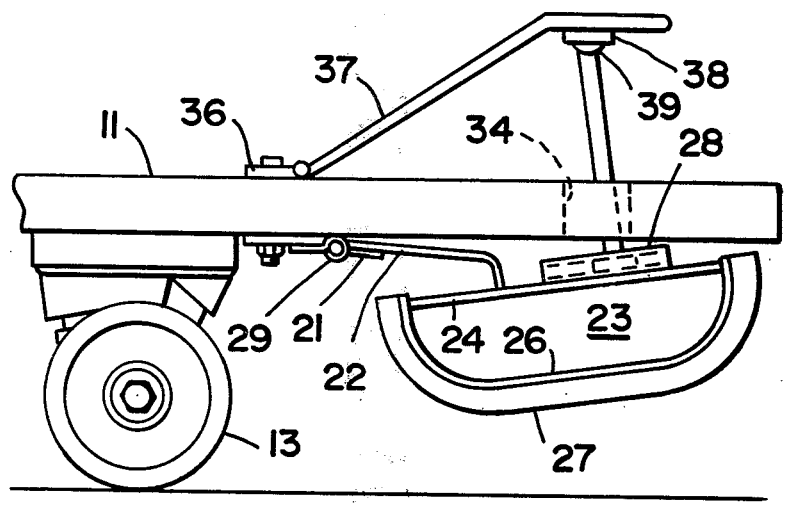
FIG_2
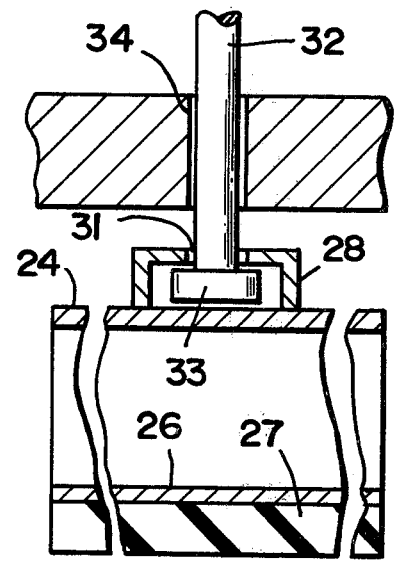
FIG_4
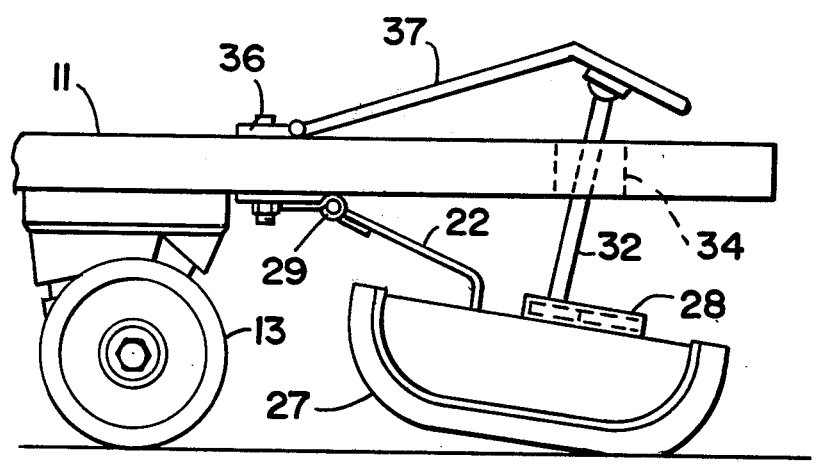
FIG_3
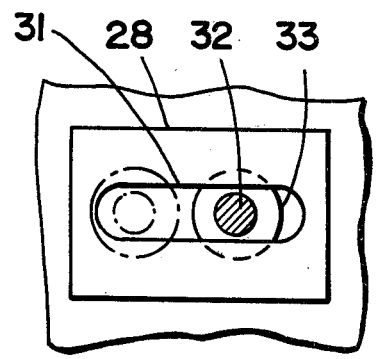
FIG_5

BRAKE ASSEMBLY FOR WHEELED PERSONAL VEHICLE

BACKGROUND OF THE INVENTION

The following U.S. Pat. Nos. represent the prior art most pertinent to the present invention: 1,050,490, 1,933,973, 2,051,762, 2,200,935, 3,288,251, 3,385,608, 4,043,566.

The prior art is replete with braking devices for personal wheeled vehicles, such as skateboards, skates, scooters, and the like. One common form of braking device includes a brake shoe which is adapted to selectively engage at least one of the wheels of the vehicle. Generally speaking, these devices include a plunger or pedal extending through the base member of the vehicle, so that the rider may engage the brake shoe with the wheel by means of force applied to the plunger. Although these devices are effective in slowing the vehicle, they have also exhibited significant defects. If sufficient frictional force is exerted on the wheels, they may lock and skid along the supporting pavement. The rider may lose control of the vehicle and suffer an accident. On the other hand, the frictional engagement of the brake shoe with the wheels may be impaired by moisture or dirt on the supporting pavement, thus reducing the braking effect to the point where the brakes become ineffective.

Other forms of braking devices provide braking members which frictionally engage the supporting pavement surface. These devices are also actuated by a pedal or plunger which is adapted to be depressed by the weight of the vehicle rider. A critical factor in the functioning of these devices is their placement with respect to the center of gravity of the vehicle, and the extent to which the braking member engages the pavement surface. For example, if the braking member is forward of the center of gravity of the vehicle, it may easily destabilize the vehicle when pressure is applied to frictionally engage the pavement. This action may cause loss of control of the vehicle. Also, it may be appreciated that if sufficient force is applied to the ground engaging member, the wheels of the vehicle correspondingly lose their traction effect on the pavement surface. Thus, in a situation requiring severe braking action, the wheels may become unweighted and the directional control of the vehicle may be lost. This is a potentially dangerous situation, and may easily result in injury to the vehicle rider.

SUMMARY OF THE PRESENT INVENTION

The present invention generally comprises a brake assembly for use in conjunction with a wheeled personal vehicle, such as a skateboard, scooter, or the like. It is designed to provide safe and effective braking action for the vehicle, without destabilizing or reducing the directional control of the vehicle.

The brake assembly includes a hinge secured to the underside of the vehicle rearwardly of the rear wheel truck, and a brake shoe secured to the hinge by a bracket arm. The brake shoe is a longitudinally extending member having upwardly curving front and rear portions, with a durable material having a high coefficient of friction secured to the ground engaging surface of the brake shoe. A spring member associated with the hinge and the bracket arm resiliently biases the brake shoe upwardly out of engagement with the pavement supporting the wheeled vehicle.

The vehicle is provided with a longitudinally extending slot disposed superjacently to the brake shoe. The brake shoe includes a channel-like track portion in the upper surface thereof, with the flat head of a plunger secured in the track portion in slidable fashion. The plunger extends upwardly away from the track portion through the slot in the vehicle. Joined to the upper surface of the rear of the vehicle is a hinged pedal, which is provided with a socket portion in the underside thereof. The upper end of the plunger is formed as a ball which is pivotally received in the socket of the pedal.

The pedal is adapted to be depressed by the weight of the rider of the vehicle. This action drives the plunger downwardly, causing it to force the brake shoe into frictional ground engagement. At the same time, the head of the plunger translates in the track portion to accommodate the changing angular relationships of the brake shoe, the plunger, and the brake pedal. Because of the placement of the brake shoe rearwardly of the rear wheel truck, the frictional drag effected by the brake shoe acts rearwardly of the center of gravity of the vehicle, so that stability and directional control of the vehicle are maintained.

A BRIEF DESCRIPTION OF THE DRAWINGS

FIG. 1 is a perspective view of a wheeled personal vehicle employing the brake assembly of the present invention.

FIG. 2 is an enlarged side view of the brake assembly of the present invention, shown in the retracted position.

FIG. 3 is a side elevation of the brake assembly shown in the ground engaging position.

FIG. 4 is an enlarged cross-sectional view of a portion of the brake assembly of the present invention.

FIG. 5 is an enlarged cross-sectional view of a portion of the brake assembly of the present invention.

DESCRIPTION OF THE PREFERRED EMBODIMENT

The present invention is generally characterized as a brake assembly which is particularly adapted for use with a wheeled personal vehicle, such as a skateboard, scooter, or the like. As shown in FIG. 1, an exemplary wheeled personal vehicle includes a base member 11 to which is secured a front wheel truck 12 and a rear wheel truck 13. Secured to the front of the base member 11 is an upwardly extending fairing 14, from which extends a pair of handles 16. The brake assembly 17 of the present invention is secured to the rear portion of the base member 11. It should be noted that the vehicle itself forms no part of the present invention.

With reference to FIG. 2, the brake assembly includes a hinge 21 having one side thereof secured to the underside of the base member 11 of the vehicle rearwardly of the rear wheel truck 13. The other side of the hinge 21 is joined to a bracket arm 22 which extends to the brake shoe 23 of the invention. The brake shoe 23 includes a flat rectangular plate 24, and a rectangular plate 26, having an arcuate, bowed configuration, joined to the front and rear ends of the plate 24. Secured to the exterior surface of the plate 26 is a brake pad 27 formed of a durable material having a high co-efficient of friction. In the preferred embodiment, the brake pad 27 is formed of a rubber material which is flexible as well as durable. It should be noted that a helical spring 29 is also secured to the hinge 21, with the arms of the spring arranged to bias the bracket arm 22 upwardly.

Joined to the upper surface of the plate 24 is a channel like structure 28, as shown in FIG. 4. The structure 28 defines a longitudinally extending slot 31 therein. The invention also includes a plunger 32 having a flat head 33. The flat head of the plunger is secured within the channel like structure 28, with the shank of the plunger extending through the slot 31 and also through a longitudinally disposed slot 34 in the base member of the vehicle. The flat head 33 of the plunger is dimensioned to be freely translatable within the channel like structure 28.

Secured to the upper surface of the base member 11, and directly above the hinge 21, is another hinge 36. Indeed, in the preferred embodiment the same bolt and nut assembly is employed to secure both hinges to the base member 11. Joined to the freely pivotting side 36 is a pedal member 37 which extends obliquely upward from the hinge. The distal portion of the pedal member 37 is bent and formed in a generally horizontal configuration when the pedal is disposed in its rest position, as shown in FIG. 2. Secured to the underside of the distal portion of the pedal 37 is a socket 38. The upper end of the shank 32 of the plunger is provided with a ball head 39 which is rotatably received in the socket 38 of the pedal.

Whenever the rider of the wheeled vehicle is desirous of slowing the progress of the vehicle, the brake assembly of the present invention may be employed by transferring some of the rider's weight to the pedal 37. This action has the effect of pressing the pedal, the plunger 32, and the brake shoe 23 until the brake pad 27 engages the supporting pavement in a frictional manner. The ball and socket connection between the pedal and the plunger, together with the slidable disposition of the flat head of the plunger in the channel structure 28, permits the parts of the brake assembly to undergo changes in angular relationship without catching or binding. Whenever the weight is released from the pedal 37, the spring 29 resiliently urges the bracket arm 22 upwardly to disengage the brake shoe from the supporting pavement. It should be noted that the rounded front and rear ends of the brake shoe 23 determine that the brake pad always engages the pavement surface in a sliding frictional fashion. That is, there is no opportunity for a wedging or jamming engagement with the pavement.

Also, the bottom surface of the brake pad 27 is canted slightly upwardly in the forward direction to promote the smooth engagement thereof with the pavement surface. Thus, the frictional engagement with the pavement increases in proportion to the force applied to the pedal 37, so that the rider is afforded precise control of the braking action of the invention.

It should also be noted that the brake assembly is disposed rearwardly of the rear wheel truck of the wheeled vehicle. Thus the drag afforded by engagement of the brake assembly with the pavement is caused to act at a point on the vehicle well to the rear of the center of gravity of the vehicle. Thus the drag caused by the brake assembly is a stabilizing force acting on the wheeled vehicle. Furthermore, although downward pressure on the brake shoe 23 will necessarily relieve some of the downward pressure on the rear wheel truck 13, the front wheels 12 will remain weighted and ground engaging in a stable, directional manner. Thus, the placement and nature of the present invention promotes the safe usage of wheeled personal vehicles by providing the safety afforded by an effective braking system which does not hinder the directional control and stability of the vehicle.

I claim:

1. In a wheeled personal vehicle including a base member having front and rear wheel trucks extending subjacently therefrom, a brake assembly comprising hinge means secured subjacently to said base member; a brake shoe disposed rearwardly of said rear wheel truck and subjacently of said base member and secured to said hinge means for pivoting to selective frictional engagement with the pavement supporting said vehicle; spring means associated with said hinge means for biasing said brake shoe upwardly out of engagement with the pavement; a pedal pivotally secured to the upper rear surface of said base member; a slot extending longitudinally insaid base member beneath a portion of said pedal; a plunger extending through said slot; ball and socket joint means joining said pedal and the upper end of said plunger; said brake shoe including an upper channel portion having a longitudinal track therein; means for slidably securing the lower end of said plunger in said track; and at least one bolt and nut assembly extending through and commonly joining said hinge means, said pedal, and said base member.

* * * * *